(12) United States Patent
Hogberg et al.

(10) Patent No.: US 6,522,636 B1
(45) Date of Patent: Feb. 18, 2003

(54) SATELLITE COMMUNICATIONS SYSTEM AND METHOD WITH REAL-TIME POWER-BASED FLOW CONTROL

(75) Inventors: Shawn Hogberg, Chandler, AZ (US); Jerry Davieau, Eldersburg, MD (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/411,727

(22) Filed: Oct. 1, 1999

(51) Int. Cl.[7] ............................................. H04B 7/185
(52) U.S. Cl. .................... 370/316; 455/12.1; 244/158 R
(58) Field of Search .......................... 455/12.1, 13.1, 455/427, 428, 574, 343; 370/316, 318; 244/158 R; 342/352, 353

(56) References Cited

U.S. PATENT DOCUMENTS

| | | | |
|---|---|---|---|
| 5,285,208 A | 2/1994 | Bertiger et al. .............. | 342/352 |
| 5,440,741 A | 8/1995 | Morales et al. .............. | 395/650 |
| 5,448,621 A | 9/1995 | Knudsen ....................... | 379/58 |
| 5,572,512 A | 11/1996 | Cutler, Jr. et al. ............. | 370/13 |
| 5,590,395 A | 12/1996 | Diekelman ................... | 455/13.1 |
| 5,594,940 A | 1/1997 | Peterson et al. ............ | 455/12.1 |
| 5,625,868 A * | 4/1997 | Jan et al. ..................... | 455/13.4 |
| 5,669,062 A | 9/1997 | Olds et al. ................... | 455/509 |
| 5,678,184 A | 10/1997 | Cutler, Jr. et al. ......... | 455/33.2 |
| 5,751,969 A | 5/1998 | Kapoor .................. | 395/200.65 |
| 5,794,120 A | 8/1998 | Cutler, Jr. et al. ......... | 455/13.1 |
| 5,862,478 A | 1/1999 | Cutler, Jr. et al. .......... | 455/428 |
| 5,867,789 A | 2/1999 | Olds et al. ................... | 455/453 |
| 6,215,780 B1 * | 4/2001 | Peters et al. ................. | 370/342 |

FOREIGN PATENT DOCUMENTS

| | | | |
|---|---|---|---|
| EP | 0712214 | 5/1996 | .......... H04B/7/005 |
| EP | 0780997 | 6/1997 | .......... H04B/7/185 |
| EP | 0805567 | 11/1997 | .......... H04B/7/185 |

* cited by examiner

*Primary Examiner*—William Trost
*Assistant Examiner*—Sharad Rampuria
(74) *Attorney, Agent, or Firm*—Ingrassia Fisher & Lorenz

(57) ABSTRACT

A method and apparatus are provided for managing the communications traffic load handled by one or more satellites (12, 120) within a satellite communications system (10) while staying within the capacity of on-board electrical power resources (90, 92, 94, FIG. 3). A forecast of the communications traffic load for a future time period is generated, using historical traffic data. Based in part upon the current onboard power capacity, predicted solar-charging conditions, and predicted traffic load, a forecast of the battery state of charge throughout the future time period is generated. If the forecast communications traffic load exceeds the forecast level of on-board power resources for the future time period, the method and apparatus undertake various remedial measures, including flow control, moving subscribers to low power channels, and terminating subscriber connections.

7 Claims, 6 Drawing Sheets

SATELLITE COMMUNICATIONS SYSTEM AND METHOD WITH REAL-TIME POWER-BASED FLOW CONTROL

FIELD OF THE INVENTION

This invention relates generally to satellite-based communications systems and, in particular, to systems and methods for managing an on-board power subsystem.

BACKGROUND OF THE INVENTION

In a satellite communications system, electrical energy is limited to that provided by an on-board power subsystem. The on-board power subsystem generally comprises one or more rechargeable batteries and one or more solar panels for recharging the batteries.

In a satellite communications system comprising a constellation of low-earth orbiting (LEO) satellites which communicate with subscriber units on Earth, the traffic load can vary considerably from one region of Earth to another, depending upon geographical, geopolitical, regulatory, and other factors. A given satellite having finite energy resources can at times experience extremely heavy levels of traffic. If such satellite expends all of its energy resources servicing one or more heavy traffic regions, it could possibly use up its energy resources and be incapable of servicing subsequent regions until its energy resources have been adequately recharged.

Accordingly, there is a significant need for systems and methods that can manage the communications traffic load handled by one or more satellites within a satellite communications system while staying within the capacity of on-board electrical power resources.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE DRAWINGS

A "satellite" is defined herein to mean a man-made object or vehicle intended to orbit Earth and includes both geostationary and orbiting satellites and/or combinations thereof including low earth orbiting (LEO) satellites. A "constellation" is defined herein to mean an ensemble of satellites arranged in orbits for providing specified coverage (e.g., radio communication, photogrammetry, etc.) of portion(s) or all of the celestial body. A constellation typically includes multiple rings (or planes) of satellites and can have equal numbers of satellites in each plane, although this is not essential. As used herein the terms "cell" and "antenna pattern" are not intended to be limited to any particular mode of generation and include those created by either terrestrial or satellite cellular communications systems and/or combinations thereof.

Figure 1:
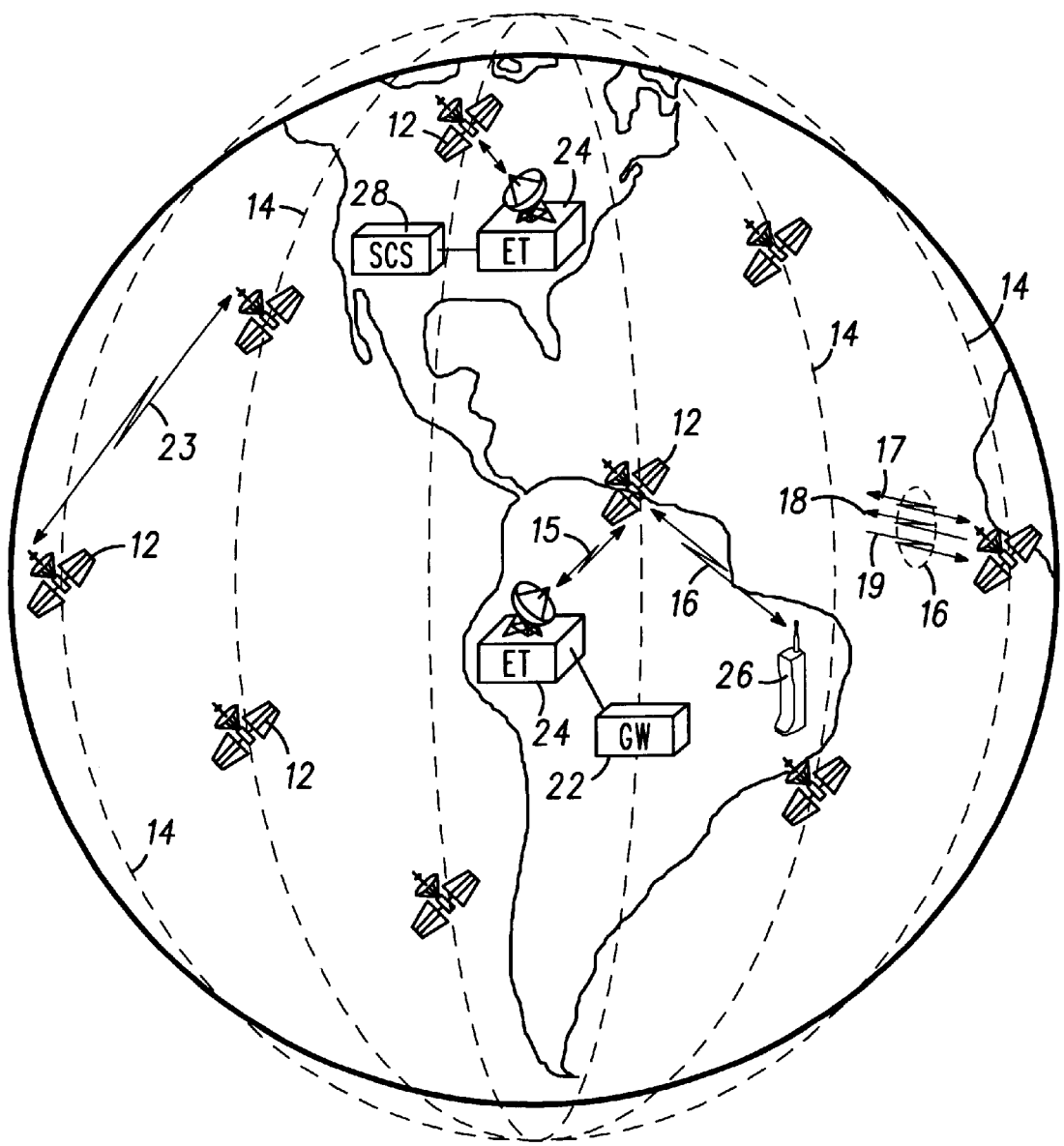
FIG. 1 depicts a simplified diagram of a satellite-based communications system with which the present invention may be practiced.

FIG. 1 illustrates a simplified diagram of a satellite-based communications system with which the present invention may be practiced. Communications system 10 uses six polar orbits 14, with each orbit 14 holding eleven satellites 12 for a total of sixty-six satellites 12. However, this is not essential and more or fewer satellites, or more or fewer orbits, can be used. While the present invention is advantageously employed when a large number of satellites are being used, it is also applicable with as few as a single satellite. For clarity, FIG. 1 illustrates only a few of satellites 12.

For example, each orbit 14 encircles Earth at an altitude of around 780 km, although higher or lower orbital altitudes can be usefully employed. Due to the relatively low orbits of exemplary satellites 12, substantially line-of-sight electromagnetic (e.g., radio, light, etc.) transmission from any one satellite or reception of signals by any one satellite involves or covers a relatively small area of Earth at any instant.

For the example shown, satellites 12 travel with respect to Earth at around 25,000 km/hr, allowing satellite 12 to be visible to a terrestrial station for a maximum period of circa nine minutes. The present invention is applicable to systems including satellites having low-Earth, medium-Earth and geo-synchronous orbits. Additionally, it is applicable to orbits having any angle of inclination (e.g., polar, equatorial or other orbital pattern).

Satellites 12 communicate with earth stations which can include some number of radio communication subscriber units (SUs) 26 and earth terminals (ETs) 24 connected to system control segment (SCS) 28. ETs 24 can also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 can be colocated with or separate from SCS 28 or GW 22. ETs 24 associated with SCSs 28 receive data describing tracking of satellites 12 and relay packets of control information, while ETs 24 associated with GWs 22 only relay data packets (e.g., relating to calls in progress).

SUs 26 can be located anywhere on the surface of the Earth or in the atmosphere above the Earth. SUs 26 are preferably communications devices capable of transmitting data to and receiving data from satellites 12. By way of example, SUs 26 can be a hand-held, portable cellular telephones adapted to communicate with satellites 12. Ordinarily, SUs 26 need not perform any control functions for communications system 10.

System 10 can accommodate any number, potentially in the millions, of subscriber units 26. In one embodiment of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and can encompass Frequency Division Multiplex Access (FDMA) and/or Time Division Multiple Access (TDMA) communications (infra) or combination thereof.

As a minimum, a satellite 12 continuously transmits over one or more broadcast channels 18. Subscriber units, 26 synchronize to broadcast channels 18 and monitor broadcast channels 18 to detect data messages which can be addressed to them. Broadcast channels 18 can also contain status information regulating access to satellite 12. In one embodiment, this status information informs SUs 26 regarding access or denial of new subscribers to satellite 12. Subscriber units 26 can transmit messages to satellites 12 over one or more acquisition channels 19. Broadcast channels 18 and acquisition channels 19 are not dedicated to any one subscriber unit 26 but are shared by all subscriber units 26 currently within view of a satellite 12.

On the other hand, traffic channels 17 are two-way channels that are assigned to particular subscriber units 26 by satellites 12 from time to time. In one embodiment of the present invention, a digital format is used to communicate data over channels 17–19, and traffic channels 17 support real-time communications. At least one traffic channel 17 is assigned for each call, and each traffic channel 17 has sufficient bandwidth to support, as a minimum, a two-way voice conversation.

To support real-time communications, a time division multiple access (TDMA) scheme is desirably used to divide time into frames, preferably in the 60–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Each satellite 12 may support from hundreds to thousands or more traffic channels 17 so that each satellite 12 can simultaneously service a like number of independent calls.

Satellites 12 communicate with other nearby satellites 12 through crosslinks 23. Thus, a communication from a subscriber unit 26 located at any point on or near the surface of the earth can be routed through the constellation of satellites 12 to within range of substantially any other point on the surface of the earth. A communication can be routed down to a subscriber unit 26 on or near the surface of the earth from a satellite 12 using a subscriber link 16. Alternatively, a communication can be routed down to or up from any of many ETs 24, of which FIG. 1 shows only two, through earth links 15. ETs 24 are preferably distributed over the surface of the earth in accordance with geo-political boundaries. In one embodiment, each satellite 12 can communicate with up to four ETs 24 and from hundreds to thousands of subscriber units 26 at any given instant.

SCS 28 monitors the health and status of system communication nodes (e.g., GWs 22, ETs 24 and satellites 12) and desirably manages operations of communications system 10. One or more ETs 24 provide the primary communications interface between SCS 28 and satellites 12. ETs 24 include antennas and RF transceivers and preferably perform telemetry, tracking, and control functions for the constellation of satellites 12. GWs 22 can perform call processing functions in conjunction with satellites 12, or GWs 22 can exclusively handle call processing and allocation of call handling capacity within communications system 10. Diverse terrestrial-based communications systems, such as the PSTN, can access communications system 10 through GWs 22.

With the example constellation of sixty-six satellites 12, at least one of satellites 12 is within view of virtually every point on Earth's surface at all times (i.e., virtually full coverage of the Earth's surface is obtained). Theoretically, any satellite 12 can be in direct or indirect data communication with any SU 26 or ET 24 at any time by routing data through the constellation of satellites 12. Accordingly, communications system 10 can establish a communication path for relaying data through the constellation of satellites 12 between any two SUs 26, between SCS 28 and GW 22, between any two GWs 22, or between SU 26 and GW 22.

Figure 2:
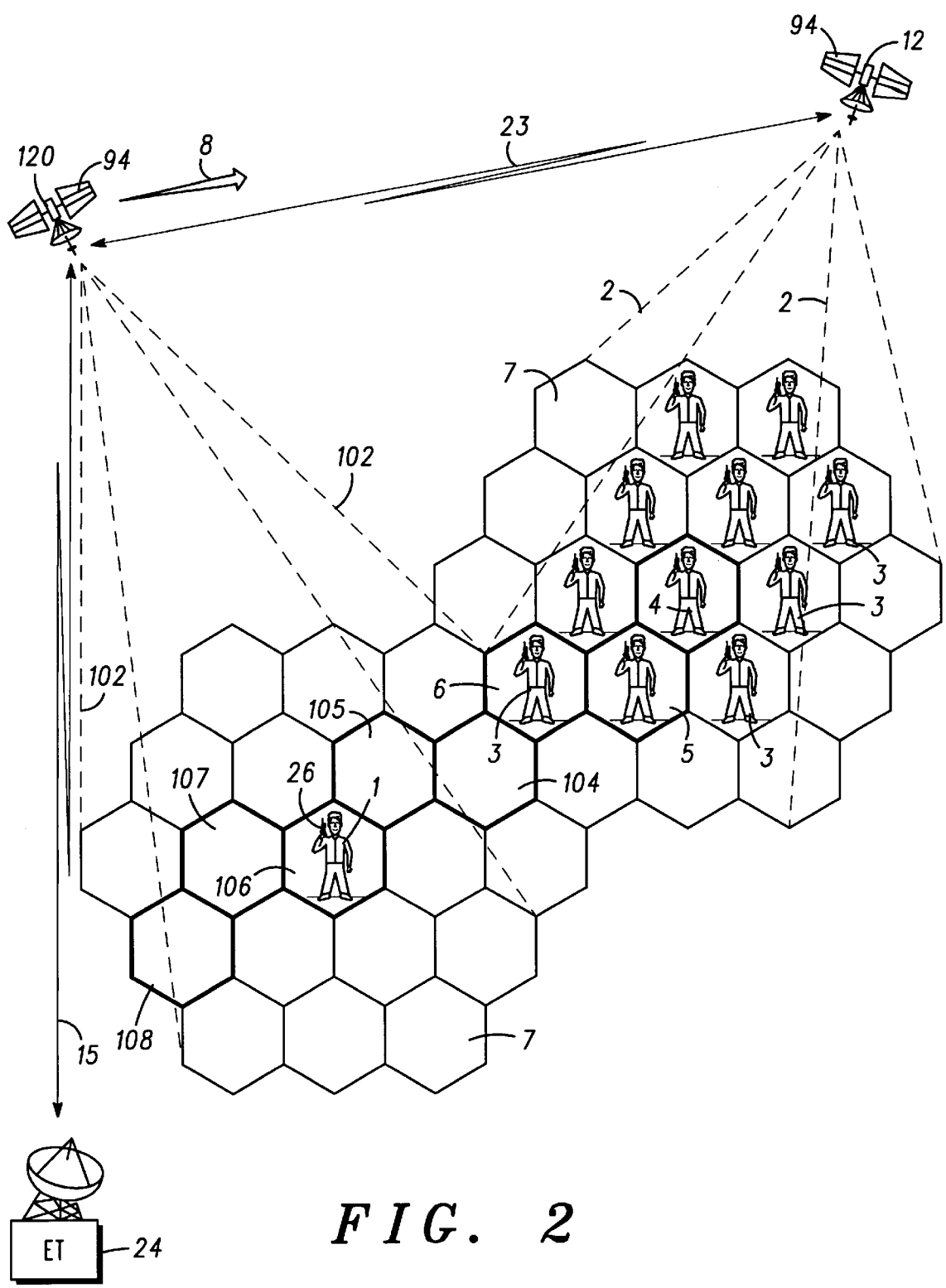
FIG. 2 depicts an antenna beam coverage pattern of two satellites in a satellite-based cellular communications system of which the present invention may form a portion thereof.

FIG. 2 depicts an antenna beam coverage pattern of two satellites in a satellite-based cellular communications system of which the present invention may form a portion thereof. As shown, the communications system comprises earth terminal 24 and multi-beam satellites 12 and 120, each having a power subsystem which is energized by means of one or more solar panels 94. Satellites 12 and 120 project multi-beam antenna patterns 2 and 102, respectively, to subscriber units 26 held by subscribers 1 and 3. Antenna patterns 2 and 102 each project a plurality of antenna cell patterns upon cells 7 on the Earth's surface.

Subscriber 1 is assumed to be located in a relatively sparsely populated area (e.g. desert, ocean, forest, or the like) beneath the current orbital position of satellite 120. In contrast, subscribers 3 are assumed to be in an area which is considerably more densely populated with subscriber units 26 beneath the current orbital position of satellite 12. While a single subscriber 1 is shown in only one cell 7 of the antenna pattern 102 of satellite 120, it will be understood that this is an exaggerated representation to illustrate that subscriber population can vary considerably over the Earth's surface. As will be explained below, the present invention is capable of accommodating real-time power-based flow control in the satellite constellation despite such extreme differences in subscriber density over the Earth's surface.

Information destined for subscriber unit 26 of subscriber 1 is assembled at a gateway and is transmitted through an earth terminal 24 with routing instructions. This packaged information is transmitted up to multi-beam satellite 120 via an earth link 15 and, when necessary, through crosslink 23 to one or more adjacent satellites 12, which can be in the same orbital plane or in an adjacent orbital plane (see FIG. 1).

Satellite 120 determines from the routing instructions that beam 106 in its antenna pattern 102 should currently be used to communicate with subscriber unit 26 of subscriber 1. Satellite 120 then transmits the packet of information to subscriber unit 26 of subscriber 1. Two-way communications take place between subscriber 1 and a subscriber elsewhere in the satellite communications system 10 using current servicing beam 106 of satellite 120.

The satellite constellation is in continuous orbit, and satellites 12 and 120, as depicted in FIG. 2, are assumed to be in the same orbital plane and moving in the direction indicated by arrow 8. Servicing beam 106 of satellite 120 moves over the Earth's surface in the direction 8 of the satellites' orbital paths. Eventually, servicing beam 106 will move past subscriber unit 26 of subscriber 1. Satellite 120 will then communicate with subscriber unit 26 of subscriber 1 via a new servicing beam 107. This is referred to as a cell-to-cell handoff. As the process continues, satellite 120 will eventually communicate with subscriber unit 26 of subscriber 1 via servicing beam 108.

Likewise, cell-to-cell handoff occurs within the antenna pattern 2 beneath satellite 12. For example, a subscriber unit within antenna beam 4 will eventually be handed off to antenna beam 5, and subsequently it will be handed off to antenna beam 6.

Along or near the boundary between the antenna patterns 2 and 102, subscriber units will experience satellite-to-satellite handoff, during which process they switch over from communicating with satellite 12 to communicating with satellite 120. For example, a subscriber unit being serviced by antenna beam 6 will eventually be switched over to an antenna beam, such as antenna beam 104, of satellite 120. As will be explained below, the present invention is capable of accommodating real-time power-based flow control in the satellite constellation despite the fact that the load demands on each satellite in the constellation are constantly changing.

Figure 3:
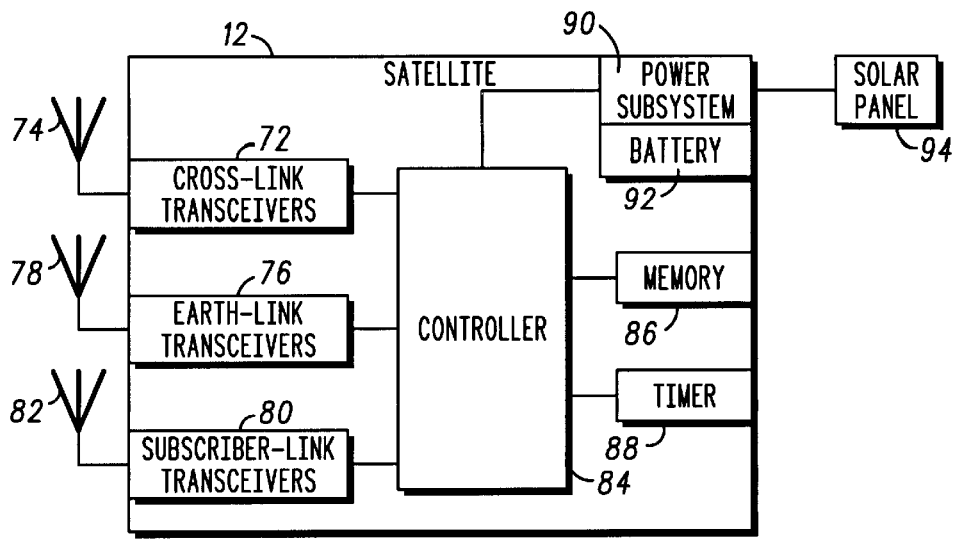
FIG. 3 illustrates a simplified block diagram of a satellite-based radio communication station suitable for use in one embodiment of the present invention.

FIG. 3 illustrates a simplified block diagram of a satellite-based radio communication station suitable for use in one embodiment of the present invention. Preferably, all satellites 12 within system 10 (see FIG. 1) include equipment as illustrated by the block diagram of FIG. 3. Satellite 12 includes cross-link transceivers 72 and associated antennas 74. Transceivers 72 and antennas 74 support cross-links to other nearby satellites 12. Earth-link transceivers 76 and associated antennas 78 support earth-links to communicate with earth terminals 24 (FIG. 1). Subscriber unit transceivers 80 and associated antennas 82 support subscriber units 26 (FIG. 1). Each satellite 12 can simultaneously support links for from hundreds to thousands of subscriber units 26 (FIG. 1). Of course, those skilled in the art will appreciate that antennas 74, 78, and 82 can be implemented either as single multi-directional antennas or as banks of discrete antennas. In one embodiment each subscriber link antenna 82 is a phased array antenna capable of accessing many cells simultaneously.

A controller 84 is coupled to each of transceivers 72, 76, and 80 as well as to a memory 86 and a timer 88. Controller 84 can be implemented using one or more processors. Controller 84 uses timer 88 to maintain, among other things, the current date and time. Memory 86 stores data that serve as instructions to controller 84 and that, when executed by controller 84, cause satellite 12 to carry out procedures which are discussed below. In addition, memory 86 includes variables, tables, and databases that are manipulated during the operation of satellite 12.

Subscriber unit transceivers 80 are desirably multi-channel FDMA/TDMA transceivers capable of transmitting and receiving on all different selectable frequencies during particular, selectable, time slots as directed by controller 84. Subscriber unit transceivers 80 contain multi-channel radios having a sufficient number of channels to provide the desired number of transmission and reception frequencies for signal access and control, and for the subscriber voice and/or data. Controller 84 can provide for allocation of the frequency and time-slot assignments, cell-to-cell hand-off and other overhead, management, and control functions. Subscriber unit transceivers 80 desirably provide for transmission and reception on any frequency channel set, so that subscriber unit transceivers 80 can, if needed, utilize the entire spectral capacity of all frequency channel sets by having the capability to handle all frequency and time slot assignments.

The satellite-based radio communication station shown in FIG. 3 also comprises a power subsystem 90, which includes battery 92 and at least one solar panel 94. In one embodiment, each satellite 12 comprises a pair of solar panels 94. Power subsystem 90 provides all of the power requirements of the on-board equipment. Power subsystem 90 is coupled to controller 84, which executes computer-readable instructions stored in memory 86 for determining the current state of charge of battery 92. In addition, controller 84 can access a lookup table stored in memory 86 to determine the ephemeris of the satellite at any time or during any time period. The satellite ephemeris table indicates the precise orbital position of the satellite at a given moment in time, e.g. Universal Mean Time (UMT).

Controller 84 can also access a lookup table stored in memory 86 to determine the times of solar eclipses and the areas on or near Earth that will be affected. The occlusion of the sun during a solar eclipse prevents the satellite's solar panel 94 from charging battery 92.

Figure 4:
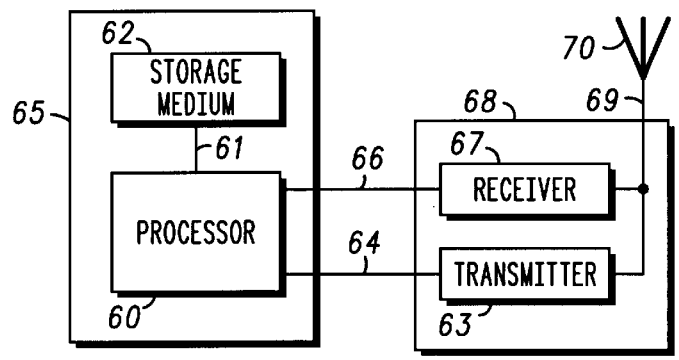
FIG. 4 illustrates a simplified block diagram of a system control station and an earth terminal suitable for use in one embodiment of the present invention.

FIG. 4 illustrates a simplified block diagram of a system control station 65 and an earth terminal 68 suitable for use in one embodiment of the present invention. System control station 65 and earth station 68 desirably form part of SCS 28 (FIG. 1) and ET 24 (FIG. 1) respectively. Control station 65 comprises at least one processor 60 coupled to associated storage medium 62 (e.g., random access memory or RAM, other semiconductor or magnetic read-write memory devices, optical disk, magnetic tape, floppy disk, hard disk etc.) via link 61.

Storage medium 62 stores variables, tables, databases, and data structures that are accessed, updated, and manipulated during the operation of satellite communications system 10. With particular regard to the present invention, storage medium 62 accumulates and stores current and historical data regarding the traffic load of every region of Earth. Such data includes the historical time slot and frequency slot assignments by time of day, including hour of the day, day of the week (including whether the day is a work day, weekend day, or holiday), week of the month, and month (including whether daylight savings time is in effect), as described in U.S. Pat. No. 5,448,621 assigned to the same assignee as the present invention.

While in one embodiment processor 60 and storage medium 62 are contained within control station 65, this is not essential. The central processing functions and memory functions can be distributed or concentrated elsewhere in the system. For example, a master control station can be used, and some or all of the monitoring and management functions described above can be concentrated therein. Alternatively, these monitoring and/or management functions can be distributed among various levels of the system in a hierarchical network, each level being responsible for monitoring and managing load at its own level.

Earth station 68 includes antenna 70 coupled to transmitter 63 and receiver 67 via link 69. Transmitter 63 and receiver 67 are coupled to processor 60 via links 64 and 66, respectively.

Processor 60 desirably carries out procedures exemplified below and described in the associated text. For example, in addition to performing other tasks as appropriate, processor 60 desirably stores results from such procedures in storage medium 62. Transmitter 63 and/or receiver 67 transmit messages to and/or receive messages from satellites 12.

Processor 60 generally controls and manages subscriber access, message reception and transmission, channel set-up, radio tuning, frequency and time slot assignment, and other cellular radio communication and control functions not managed or provided for by controller 84 (FIG. 3). Among other things, processor 60 and/or controller 84 (FIG. 3) desirably executes procedures to manage satellite-based power subsystems 90 within communications system 10. This can include procedures for determining traffic load forecasts and for determining future power resources and other associated functions as discussed below.

Figure 5:
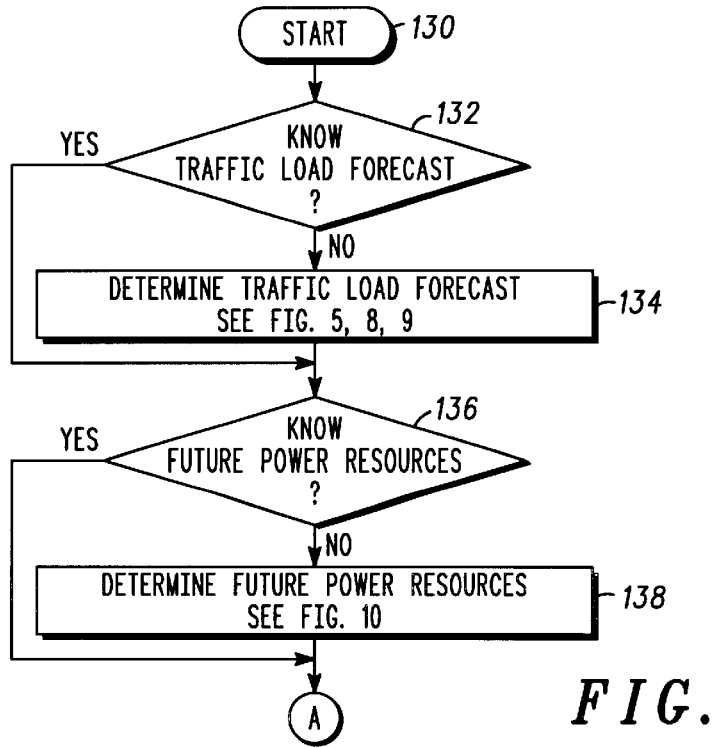
FIGS. 5–7 together show a mainline flow chart for operating a real-time power-based flow control communications system and method for use in one embodiment of the present invention.
Figure 6:
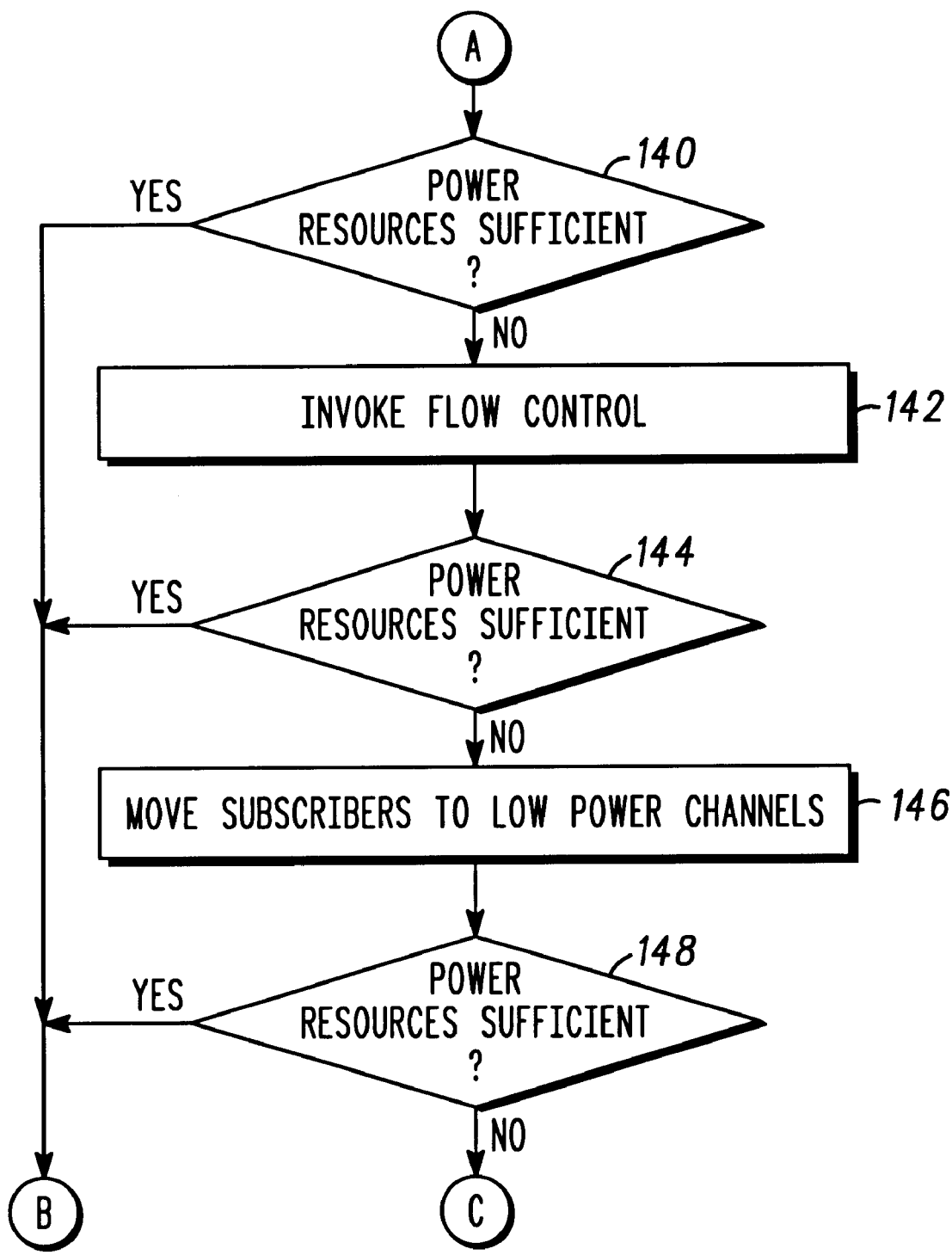
Figure 7:
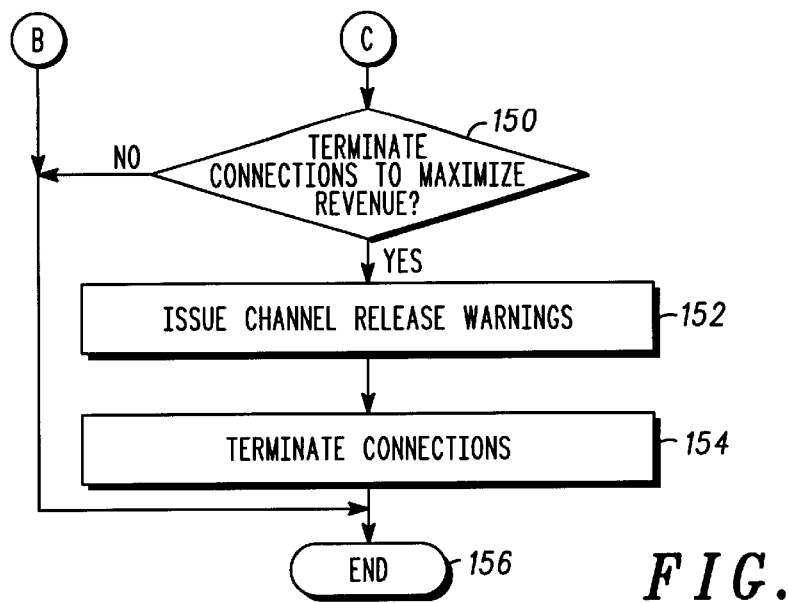

FIGS. 5–7 together show a mainline flow chart for operating a real-time power-based flow control communications system and method for use in one embodiment of the present invention.

Referring to FIG. 5, in task or operation 132 a query is made whether the traffic load forecast is known. If so, the procedure jumps to task 136; otherwise, it proceeds to task 134, wherein the traffic load forecast is determined in accordance with the tasks described in FIGS. 8–9.

In task 136 a query is made whether the future power resources are known. If so, the procedure jumps to task 140 (FIG. 6); otherwise, it proceeds to task 138, wherein the future power resources are determined in accordance with the tasks described in FIG. 10.

Referring to FIG. 6, in task 140 a query is made whether the power resources are sufficient. If so, the procedure ends in block 156 (FIG. 7); otherwise, it proceeds to task 142, where flow control measures are put into effect. Flow control or traffic control measures include a variety of operations for reducing traffic being handled by a satellite, including selectively shutting down certain antenna beams in the antenna pattern, reducing traffic on communications channels, blocking new calls, and handing off traffic to adjacent satellites. However, flow control measures do not include moving subscribers to low power channels or terminating their connections.

In task 144, another query is made whether the power resources are sufficient. If so, the procedure ends in block 156 (FIG. 7); otherwise, it proceeds to task 146, wherein subscribers are moved to low power channels.

In task 148, another query is made whether the power resources are sufficient. If so, the procedure ends in block 156 (FIG. 7); otherwise, it proceeds to task 150 (FIG. 7), wherein a query is made whether to terminate some subscriber connections. If so, the procedure proceeds to task 152, wherein channel release warnings are issued to subscriber units; otherwise, it ends in block 156. In task 154, subscriber connections are terminated. They may be terminated in accordance with an algorithm or with criteria that maximize revenue.

Figure 8:
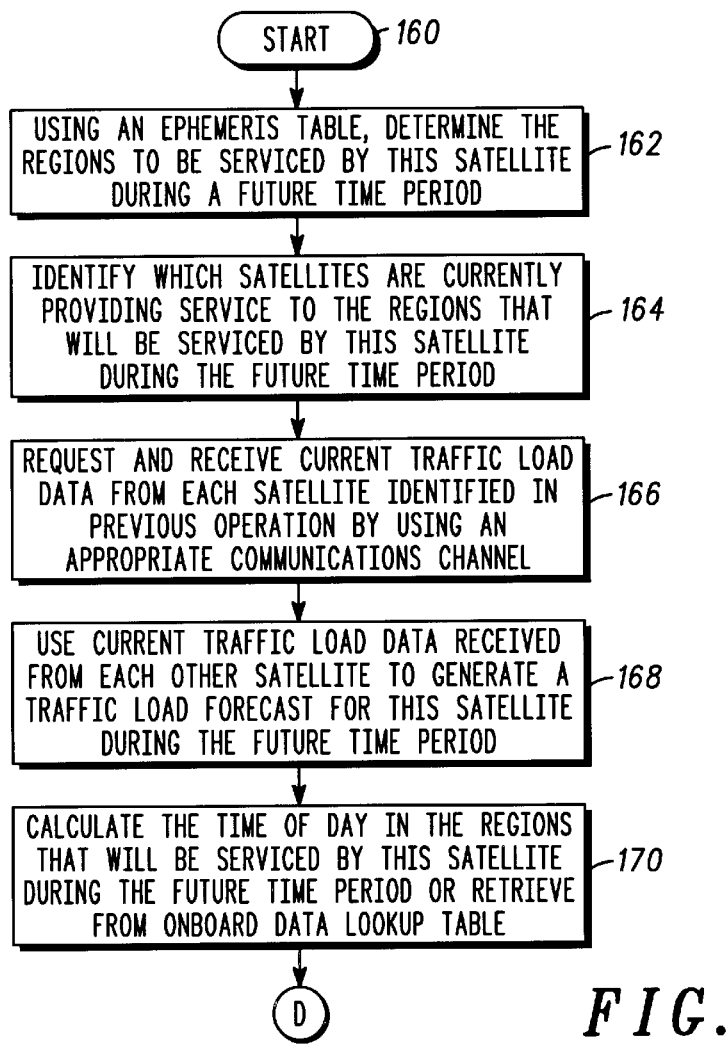
FIGS. 8–9 together show a flow chart for determining traffic load forecast for use in one embodiment of the present invention.
Figure 9:
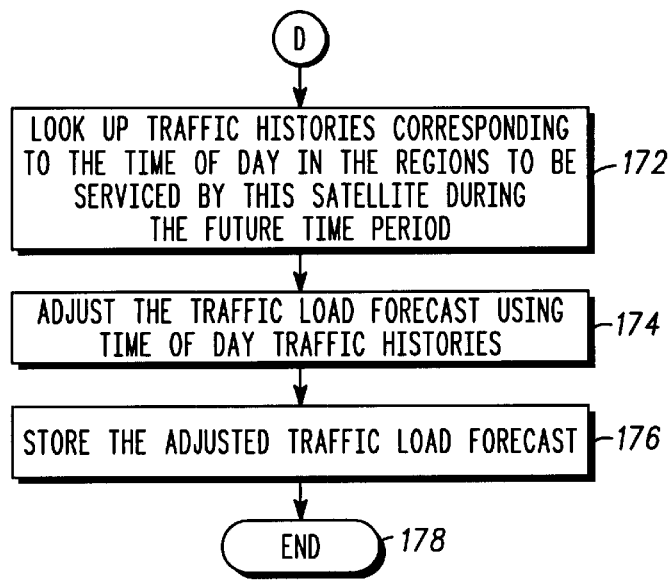

FIGS. 8–9 together show a flow chart for determining traffic load forecast for use in one embodiment of the present invention.

First, regarding FIG. 8, in task 162 the regions to be serviced by the satellite of interest during a future time period are determined, using an ephemeris table. It will be understood by one of ordinary skill that the operations in the flow chart illustrated in FIGS. 8–9 can be applied to more than one satellite, for example by a central system control station 65.

In task 164 the satellites which are currently providing service to the regions that will be serviced by the satellite of interest during the future time period are identified.

In task 166 the current traffic load data is requested and received from each satellite identified in the previous task by using one or more appropriate communications channels, such as cross-links or earth-links.

In task 168 the current traffic load data received from other satellites is used to generate a traffic load forecast for the satellite of interest during the future time period.

In task 170 the time of day in the regions that will be serviced by the satellite of interest during the future time period are either calculated or retrieved from an onboard data lookup table.

In task 172 the traffic histories corresponding to the time of day in the regions to be serviced by the satellite of interest during the future time period are looked up.

In task 174 the traffic load forecast is adjusted, using the time of day traffic histories.

In task 176 the adjusted traffic load forecast is stored, for example in on-board memory 86.

Figure 10:
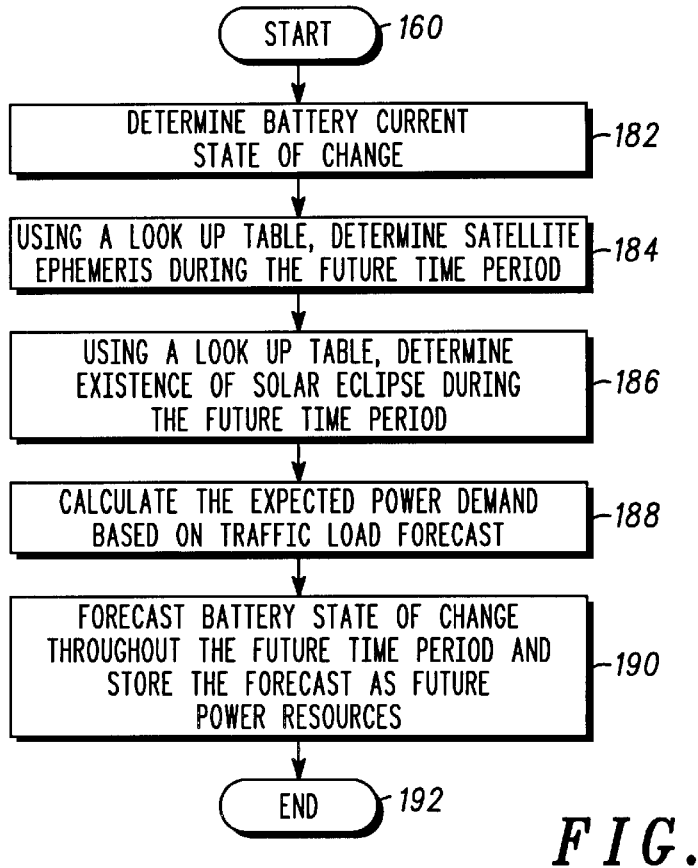
FIG. 10 shows a flow chart for determining future power resources for use in one embodiment of the present invention.

FIG. 10 shows a flow chart for determining future power resources for use in one embodiment of the present invention.

In task 182 the current state of charge of the on-board battery 92 is determined in any suitable manner which will be apparent to one of ordinary skill in the art.

In task 184 the satellite ephemeris during the future time period is determined using a lookup table.

In task 186 the existence of any solar eclipse during the future time period is determined using a lookup table.

In task 188 the expected power demand is calculated based upon the traffic load forecast.

In task 190 the battery state of charge is forecast throughout the future time period. This value or series of values is stored as "Future Power Resources" and subsequently returned, as necessary, to task 138 of the flow diagram shown in FIG. 5.

It will be understood by those skilled in the art that the operations of the methods shown and described herein can be carried out in a different order than those described with reference to FIGS. 5–10. It will also be understood that while the flowcharts have "Start" and "End" blocks, in general the processes they depict are continuously performed.

With reference to FIGS. 3 and 4, it will be seen that the contents of memory 86 and storage medium 62 represent data structures stored in a computer-readable medium. The data structures comprise historical data (including current data) regarding the traffic load of every region of Earth or, alternatively, of just certain regions of Earth. Such data can include the historical time slot and frequency slot assignments, and subscriber demand, by time of day, including hour of the day, day of the week (including whether the day is a work day, weekend day, or holiday), week of the month, and month (including whether daylight savings time is in effect). Such data structures can also comprise the current and forecast battery state of charge for one or more satellites in the constellation, as well as one or more ephemeris tables for indicating the precise orbital position of each satellite with respect to Earth at a precise time, e.g. Universal Mean Time (UMT).

A computer-readable medium (memory 86 or storage medium 62) comprises a first block of data stored in a first region of memory addresses in the medium. The first block comprises historical data regarding a traffic load of a first satellite over a region of Earth. The first block can also comprise historical data regarding a traffic load of an entire constellation of satellites (or a portion thereof) over regions of Earth serviced by the constellation of satellites.

The medium further comprises a second block of data stored in a second region of memory addresses in the medium. The second block comprises data regarding a forecast state of charge of a battery throughout a future time period as a satellite, which is powered by the battery. The second block of data can also store data regarding a forecast state of charge of a battery throughout a future time period as one of an entire constellation of satellites, which is powered by the battery. The second block of data can also store data regarding a forecast state of charge of all or a portion of batteries for corresponding satellites in the constellation as they perform communications traffic loads over their respective regions of Earth.

Thus there have been described above systems and methods for managing the communications traffic load handled by one or more satellites within a satellite communications system while staying within the capacity of on-board electrical power resources.

The systems and methods described herein are effective in preventing the exhaustion of on-board energy resources, such as could cause reduction or disruption of satellite communications. The systems and methods safeguard on-board energy levels by predicting communications traffic loads in future time periods using historical traffic data, predicting on-board energy levels for such time periods, and managing the on-board energy expenditure to remain within the on-board energy budget over relatively long periods of time.

As a result, a communications systems utilizing the systems and methods of the present invention has a greater potential for commercial success and avoiding lost revenue as a result of blocked or dropped calls, silent satellites, and/or faulty operation.

The system and method are quite versatile and can be implemented in a distributed manner in individual satellites of the satellite constellation, or implemented by a centralized control station, or implemented by a combination of centralized and distributed mechanisms.

As described herein, the advantages of the present invention will be apparent to those of skill in the art and will provide improved systems and methods for managing traffic load and on-board energy resources in a resource-limited communications system.

While the invention has been described in terms of specific examples, it is evident that many alternatives and variations will be apparent to those skilled in the art based on the description herein, and it is intended to include such variations and alternatives in the claims.

What is claimed is:

1. In a satellite which is adapted to be used to perform a communications traffic load in a satellite communications system, a method for managing an electrical power subsystem on-board the satellite, the method comprising:

determining a plurality of regions that will be serviced by the satellite during a future time period;

identifying at least one other satellite that is currently providing service to the plurality of regions that will be serviced by the satellite during the fixture time period;

receiving current traffic load data from the at least one other satellite that is currently providing service to the plurality of regions that will be serviced by the satellite during the future time period;

generating a traffic load forecast for the satellite during the future time period with the current traffic load data from the at least one other satellite that is currently providing service to the plurality of regions that will be serviced by the satellite during the future time period;

determining a time of day that the satellite will service the plurality of regions during the future time period;

identifying traffic histories corresponding to the time of day that the satellite will service the plurality of regions during the future time period;

adjusting the traffic load forecast for the satellite during the future time period using the traffic histories corresponding to the time of day;

assessing a capacity of the electrical power subsystem to satisfy the traffic load forecast for the satellite during the failure time period; and managing the traffic load within the capacity of the electrical power subsystem.

2. The method of claim 1 wherein the satellite comprises a battery, a solar panel that charges the battery when the solar panel is exposed to sunlight, a controller, and a memory, and wherein the assessing the capacity of the electrical power subsystem to satisfy the traffic load forecast for the satellite during the future time period comprises:

determining a current state of charge in the battery; and determining a satellite ephemeris during the future time period indicating when the solar panel will be exposed to sunlight to charge the battery.

3. The method of claim 2 wherein the assessing the capacity of the electrical power subsystem to satisfy the traffic load forecast for the satellite during the future time period further comprises calculating an expected power demand during the future time period using the traffic load forecast.

4. The method of claim 3 wherein the assessing the capacity of the electrical power subsystem to satisfy the traffic load forecast for the satellite during the future time period further comprises forecasting a battery state of charge throughout the future time period using the expected power demand.

5. The method of claim 1 wherein the managing the traffic load within the capacity of the electrical power subsystem comprises:

determining whether the capacity of the electrical power subsystem can satisfy the traffic load forecast; and invoking flow control on the traffic load of the satellite if the capacity of the electrical power subsystem cannot satisfy the traffic load forecast.

6. The method of claim 5 wherein the step of managing the traffic load within the capacity of the electrical power subsystem further comprises:

determining whether the capacity of the electrical power subsystem can satisfy the communications traffic load forecast after flow control has been invoked; and moving subscribers of the satellite communications system to low power channels of the satellite if the capacity of the electrical power subsystem cannot satisfy the traffic load forecast after invoking the flow control.

7. The method of claim 6 wherein the managing the traffic load within the capacity of the electrical power subsystem further comprises:

determining whether the capacity of the electrical power subsystem can satisfy the traffic load forecast after subscribers have been moved to low power channels; and terminating connections to subscribers if the capacity of the electrical power subsystem cannot satisfy the traffic load forecast after subscribers have been moved to low power channels.

* * * * *